(No Model.)
S. S. DENNIS & T. F. THORN.
CUTTING APPARATUS FOR MOWERS.
No. 602,734. Patented Apr. 19, 1898.
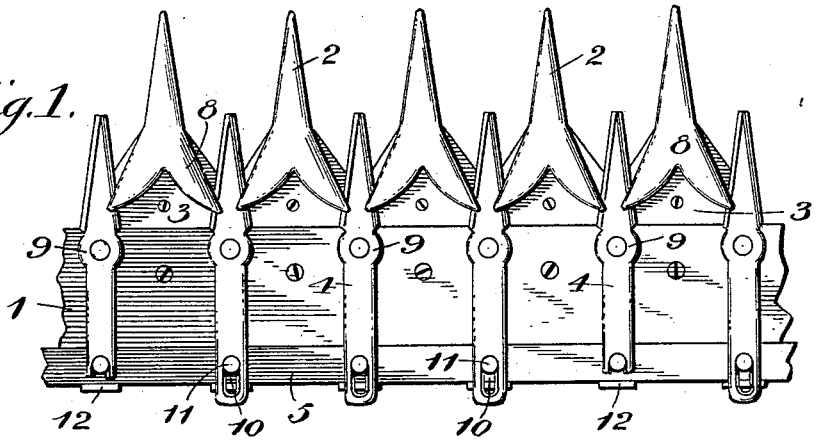
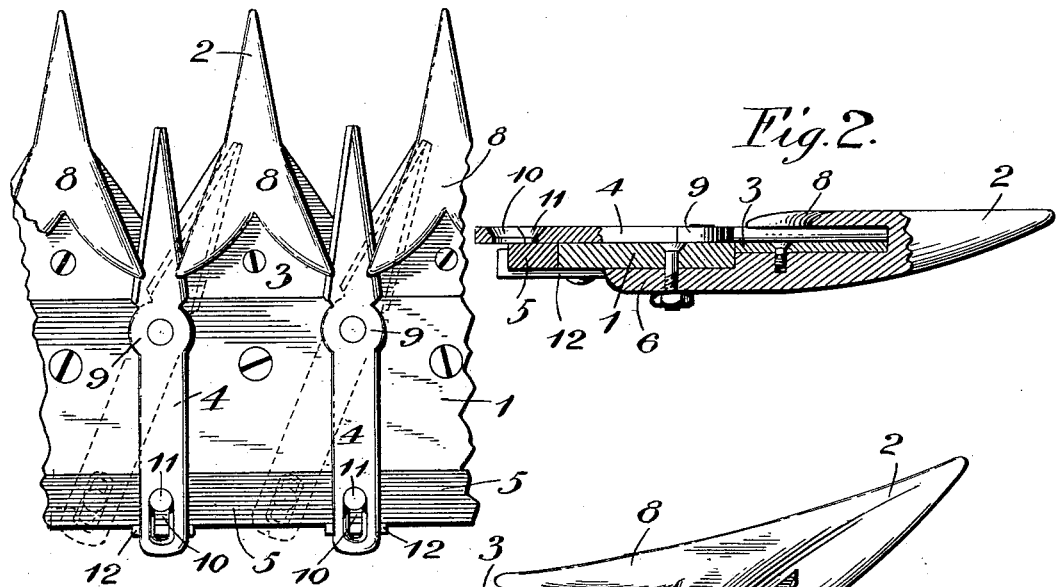
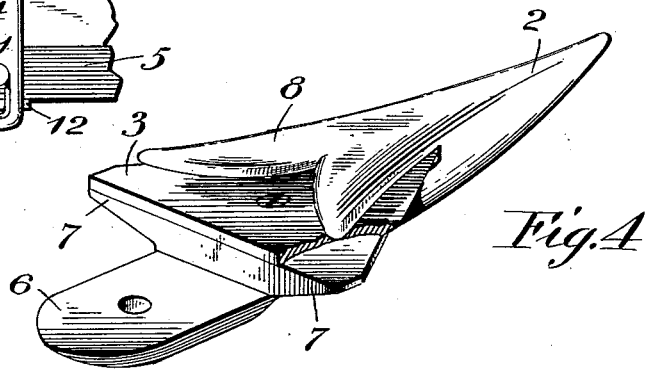
Witnesses
J. Frank Culverwell
V. B. Hillyard
Inventors
Seba S. Dennis
and Thomas F. Thorn
By their Attorneys,
C. A. Snow & Co.

UNITED STATES PATENT OFFICE.

SEBA S. DENNIS AND THOMAS F. THORN, OF EDINA, MISSOURI, ASSIGNORS OF ONE-HALF TO HENRY S. DIXSON, OF SAME PLACE.

CUTTING APPARATUS FOR MOWERS.

SPECIFICATION forming part of Letters Patent No. 602,734, dated April 19, 1898.

Application filed July 10, 1897. Serial No. 644,090. (No model.)

*To all whom it may concern:*

Be it known that we, SEBA S. DENNIS and THOMAS F. THORN, citizens of the United States, residing at Edina, in the county of Knox and State of Missouri, have invented a new and useful Cutting Apparatus for Mowers, &c., of which the following is a specification.

This invention relates to cutting apparatus for harvesters, mowers, reapers, &c., of the type comprising a series of stationary cutters and a corresponding number of oscillating or pivoted cutters connected to operate simultaneously and work in conjunction with the fixed cutters for mowing down grass, grain, and other growth.

One of the chief objects of the invention is to maintain close engagement of the coöperating cutters when the apparatus is in operation. To this end the guard-fingers have the overhanging parts extended so as to engage with the edge portions of adjacent pivoted cutters when the latter stand midway between the guards or in the intended normal position.

A further object is to support the ledger-plates forming the fixed cutters and enable them to be made as thin as possible, so as to be readily sharpened when required.

Other objects and advantages are contemplated and will appear in the course of the subjoined description and in the appended claims, and for a full understanding of the merits and advantages of the invention reference is to be had to the accompanying drawings.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a cutting apparatus constructed in accordance with this invention. Fig. 2 is a transverse section. Fig. 3 is a detail view of a portion of the cutting apparatus on a larger scale, showing the operation of the pivoted cutters by dotted lines. Fig. 4 is a detail view in perspective of a guard-finger.

Corresponding and like parts are referred to in the following description and indicated in the several views of the drawings by the same reference characters.

The cutting apparatus in its construction comprises a plate 1, guard-fingers 2, ledger-plates 3, forming the fixed cutters, oscillating or pivoted cutters 4, and an operating-bar 5, connecting and simultaneously actuating the pivoted cutters.

The guard-fingers are provided at their inner or rear end with a tang 6, which is apertured to receive a fastening-bolt by means of which the fingers are secured to the plate 1, side flanges 7 in advance of the tang and adapted to engage with the front edge of the plate 1, so as to prevent any lateral movement of the guard-fingers and guards 8, the latter overhanging the flanged portion of the fingers and expanded so that the rear corners of each guard will extend over the edge portions of contiguous cutters when the latter occupy a position intermediate of adjacent fingers.

The side flanges 7 have their upper surface in the same plane which is slightly below the plane of the top surface of the plate 1, so that when the ledger-plates or fixed cutters 3 are in position thereon they will come flush with the top surface of the plate 1, thereby enabling the lower side of the pivoted cutters being in the same plane and operating over the plate 1 and fixed cutters. The edges of the side flanges converge as they approach the front end of the fingers and merge into the sides thereof. These flanges in addition to forming a firm support for the ledger-plates or fixed cutters engage at their rear ends with the front edge of the plate 1 and constitute an abuting shoulder which engages with the front edge of the plate 1 and prevents lateral vibration of the guard-fingers when the apparatus is in active service.

The ledger-plates or fixed cutters 3 are of tapering form and secured to the top side of the fingers and side flanges thereof by rivets, bolts, or other means, and are composed of comparatively thin steel highly tempered and are prevented from bending or breaking at their working edges by the supporting-flanges of the guard-fingers as said flanges approach close to the outer edges of the said cutters, leaving a sufficient margin to provide for wear incident to service and sharpening. The guards 8 conform to the inner flanged portion of the fingers, and the space between them and the ledger-plates corresponds to the thickness of the oscillating or pivoted cutters, whereby the latter are held upon the ledger-plates by positive action when in operation. For the sake of lightness and in order to obviate the clogging of the space between the guards and the fixed cutters a V-shaped notch is formed in the inner rear edge of each guard 8, thereby providing, in effect, two horns, the extremities of which project over and engage with adjacent cutters 4. The component parts of the guard-fingers are integrally formed, thereby resulting in the provision of a rigid structure and obviating the formation of any joints and the requirement of fastenings for securing the parts together.

The cutters 4 have approximately circular portions 9 intermediate of their ends, and these circular parts have openings to receive bolts or other fastenings, by means of which the cutters are pivotally connected to the plate 1. The front ends of the cutters 4 are made tapering, and their longitudinal edges are oppositely beveled, forming chisel-shaped edges which coöperate with the cutting edges of the ledger-plates 3, whereby the grain is severed by a shear action. By having the circular portions 9 an extended bearing is provided between the pivoted cutters and the plate 1, thereby assisting materially in overcoming the tendency to torsional action. The rear ends of the pivoted cutters are slotted longitudinally, as shown at 10, and these slots receive pivot-fastenings 11, by means of which the pivoted cutters have direct connection with the operating-bar 5.

Straps or irons 12 are secured to the lower side of the plate 1 and extend in the rear thereof and have their rear ends bent vertically, so as to engage with the rear edge of the operating-bar and retain the latter in place. The operating-bar slides upon the straps or irons 12, between the rear edge of the plate 1 and the bent ends of the said straps, and its upper side comes flush with the top side of the plate 1, thereby obviating the provision of any projecting part which would obstruct the free passage of the grain over the plate 1 onto the platform and cause the lodgment of any matter which would preclude the free working of the bar.

In assembling the parts the pivoted cutters are located midway the space between adjacent guard-fingers, so that under normal conditions the rear corners of the guards, or the extremities of the horns thereof, will extend over the edge portions of contiguous cutters, so that when the cutting apparatus is in motion the active ends of the cutters will operate beneath the guards and be held upon the ledger-plates or fixed cutters, so as to insure a coöperation of the coördinate cutting edges when the apparatus is in operation in the field.

Having thus described the invention, what is claimed as new is—

In cutting apparatus for harvesters, mowers and the like, the combination of a plate, guard-fingers having tangs secured to the lower side of the plate and formed with forwardly-convergent side flanges, and having rearwardly-divergent horns with their outer edges alining vertically with corresponding edges of the said side flanges, tapering ledger-plates secured to the guard-fingers and having their edges projecting beyond the edges of the side flanges and horns and coming flush with the top side of the aforesaid plate, and having the front ends of the edges merging into the sides of the guard-fingers to avoid projecting shoulders, oscillating cutters pivoted to the said plate and projecting beyond the rear edge thereof, and having their projecting ends longitudinally slotted, and having their front ends normally intermediate of adjacent guard-fingers, their edge portions coming beneath the aforesaid horns, which prevent any upward movement of the cutters, irons secured to the bottom side of the aforementioned plate and having their rear ends bent vertically, and an operating-bar confined between the rear edge of the plate, the bent ends of the irons, and the rear ends of the oscillating cutters, and having pivot projections entering the slots of the said cutters, substantially as and for the purpose set forth.

In testimony that we claim the foregoing as our own we have hereto affixed our signatures in the presence of two witnesses.

SEBA S. DENNIS.
THOMAS F. THORN.

Witnesses:
J. J. JACK,
HENRY BLACK.